US011938645B2

(12) United States Patent
Takabu

(10) Patent No.: US 11,938,645 B2
(45) Date of Patent: Mar. 26, 2024

(54) CUTTING IMPLEMENT AND METHOD FOR MANUFACTURING SAME

(71) Applicant: KABUSHIKI KAISYA LEBEN, Yokohama (JP)

(72) Inventor: Atsushi Takabu, Kanagawa (JP)

(73) Assignee: KABUSHIKI KAISYA LEBEN, Kanagawa (JP)

(*) Notice: Subject to any disclaimer, the term of this patent is extended or adjusted under 35 U.S.C. 154(b) by 208 days.

(21) Appl. No.: 17/284,621

(22) PCT Filed: May 24, 2019

(86) PCT No.: PCT/JP2019/020626
§ 371 (c)(1),
(2) Date: Apr. 12, 2021

(87) PCT Pub. No.: WO2020/084818
PCT Pub. Date: Apr. 30, 2020

(65) Prior Publication Data
US 2021/0339409 A1 Nov. 4, 2021

(30) Foreign Application Priority Data
Oct. 26, 2018 (JP) ................................ 2018-202185

(51) Int. Cl.
*B26B 9/02* (2006.01)
*B26D 1/00* (2006.01)

(52) U.S. Cl.
CPC .............. *B26B 9/02* (2013.01); *B26D 1/0006* (2013.01)

(58) Field of Classification Search
CPC ................ B26B 9/00; B26B 9/02; B26B 3/00
USPC ........................................................ 76/104.1
See application file for complete search history.

(56) References Cited

U.S. PATENT DOCUMENTS 1,607,083 A * 11/1926 Ignatieff ................. B23B 27/00 407/119
4,495,698 A * 1/1985 Gerber, Jr. ................ B26B 9/00 76/104.1
4,881,430 A * 11/1989 Hubbard .................... B21J 1/00 228/186
(Continued)

FOREIGN PATENT DOCUMENTS

CN 201456028 U 5/2010
CN 201950685 U 8/2011
(Continued)

OTHER PUBLICATIONS

International Search Report of PCT/JP2019/020626, dated Jun. 18, 2019, 5 pages including English translation.
(Continued)

*Primary Examiner* — Jennifer S Matthews
(74) *Attorney, Agent, or Firm* — Hamre, Schumann, Mueller & Larson, P.C.

(57) ABSTRACT

Provided is a cutting implement which is easily ground or which needs no grinding and is safe. The cutting implement is a cutting implement including an acting portion 3 that cuts an object to be cut, the cutting implement configured such that the acting portion 3 includes a main body portion 4 and a small thickness portion 5 whose thickness is smaller than the thickness of the main body portion 4 and the small thickness portion 5 has a width of 2.5 to 20 mm and a thickness of 0.1 to 0.5 mm.

4 Claims, 21 Drawing Sheets

(56) References Cited

U.S. PATENT DOCUMENTS

| | | | | | |
|---|---|---|---|---|---|
| 6,330,750 | B1 * | 12/2001 | Meckel | B26B 9/00 30/346.54 |
| 9,902,013 | B2 * | 2/2018 | Uemura | B26B 21/4068 |
| 9,956,696 | B2 * | 5/2018 | Davis | B26B 9/02 |
| 10,118,302 | B2 * | 11/2018 | Nishihara | C04B 35/119 |
| 2006/0207110 | A1 * | 9/2006 | Nishigaki | B26B 3/00 30/350 |
| 2010/0180452 | A1 * | 7/2010 | Mucci | B26B 9/02 30/356 |

FOREIGN PATENT DOCUMENTS

| | | | | | |
|---|---|---|---|---|---|
| CN | 202155892 | U | | 3/2012 | |
| CN | 103112016 | | | 5/2013 | |
| CN | 203077306 | U | | 7/2013 | |
| CN | 103273504 | | | 9/2013 | |
| CN | 206393676 | U | | 8/2017 | |
| CN | 108582166 | | | 9/2018 | |
| CN | 108582166 | A | * | 9/2018 | B26B 3/00 |
| CN | 110116426 | A | * | 8/2019 | |
| DK | 160683 | B | | 4/1991 | |
| JP | S55-113485 | A | | 9/1980 | |
| JP | S62-68480 | A | | 3/1987 | |
| JP | H06-31989 | U | | 4/1994 | |
| JP | 3006509 | U | | 1/1995 | |
| JP | H10-58377 | A | | 3/1998 | |
| JP | 3124583 | U | | 8/2006 | |
| JP | 6399468 | B1 | | 10/2018 | |
| KR | 20170033089 | A | * | 3/2017 | |

OTHER PUBLICATIONS

Office Action issued for Chinese Patent Application No. 201980067348.3, dated Mar. 30, 2022, 11 pages including English translation.

* cited by examiner

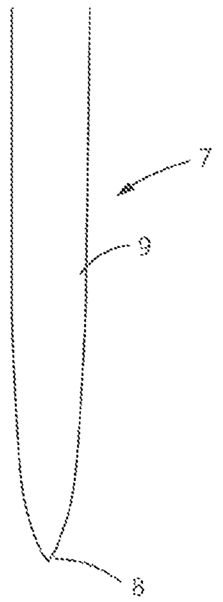
Fig.4A - PRIOR ART
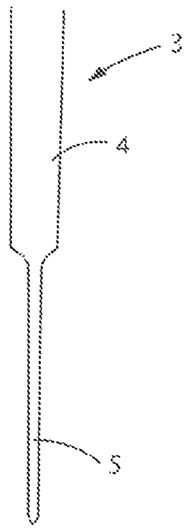
Fig.4B

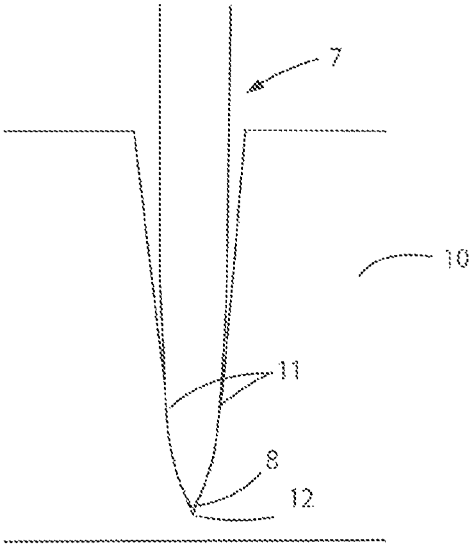
Fig.5A - PRIOR ART
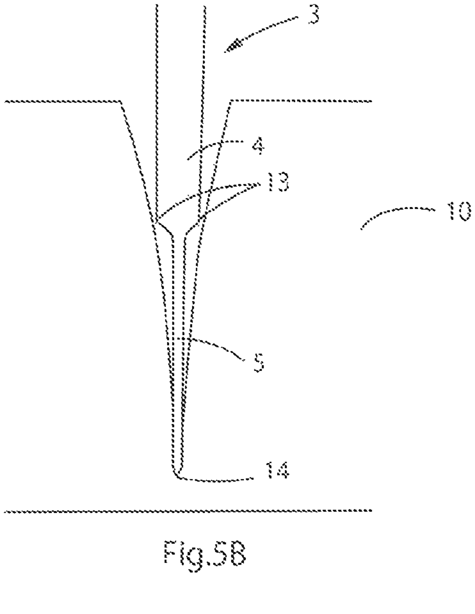
Fig.5B

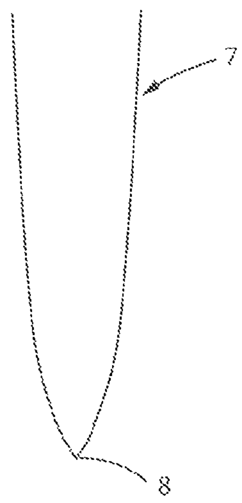
Fig.6A - PRIOR ART
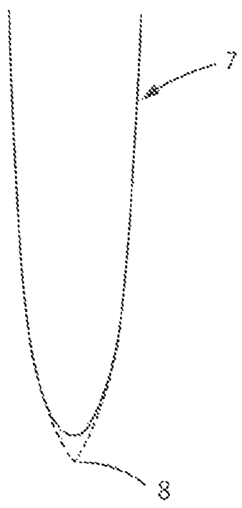
Fig.6B - PRIOR ART
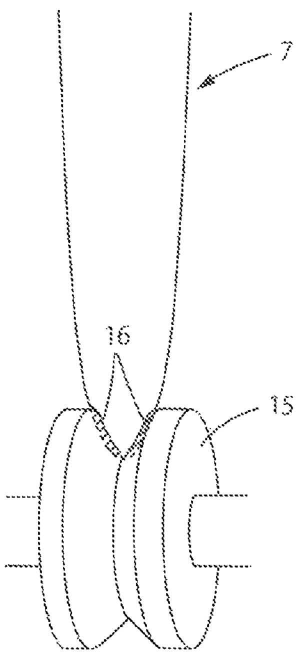
Fig.6C - PRIOR ART

CUTTING IMPLEMENT AND METHOD FOR MANUFACTURING SAME

TECHNICAL FIELD

The present invention relates to a cutting implement and a method for manufacturing the cutting implement. The present invention claims priority to Japanese Patent Application No. 2018-202185, filed Oct. 26, 2018, and, in designated states where incorporation by literature reference is allowed, the contents of this application are incorporated herein by reference in their entirety.

BACKGROUND ART

An edge called a convex edge has conventionally been used widely. The convex edge is an edge with a cutting edge whose cross section perpendicular to the length direction of the edge has the shape of a gentle arc on both sides of the end (cutting edge).

PTL 1 proposes the shape of an edge designed to achieve a sharp edge which is easily ground. PTL 1 proposes an edge provided with a concave surface in an intermediate position of a flat surface from a cutting edge (an end of the edge) to a ridge (a thickened portion of a main body).

CITATION LIST

Patent Literature

PTL 1: JP-A-55-113485

SUMMARY OF INVENTION

Technical Problem

PTL 1 focuses attention on the fact that the surface from the acute cutting edge to the ridge is large in width. When the surface from the cutting edge to the ridge is large in width, it is difficult to grind the surface in a parallel manner. To address this problem, the concave surface is provided in this surface to narrow the width of the surface to be ground in a parallel manner.

However, the edge of PTL 1 has the very acute cutting edge in the first place, which makes it difficult to grind the edge. Moreover, since the cutting edge is very acute, it is easily nicked.

On the other hand, the convex edge also makes it difficult to restore an intrinsic shape thereof from a blunt shape by grinding. Moreover, the convex edge has many portions to be cut by grinding, which requires time and effort to perform grinding.

Therefore, in view of the problem described above, an object of the present invention is to provide a cutting implement which is easily ground or which needs no grinding and is safe.

Solution to Problem

The present invention is, for example, a cutting implement including an acting portion that cuts an object to be cut, wherein the acting portion includes a main body portion and a small thickness portion whose thickness is smaller than a thickness of the main body portion, and the small thickness portion has a width of 2.5 to 20 mm and a thickness of 0.1 to 0.5 mm.

Moreover, the present invention is, for example, a cutting implement including an acting portion that cuts an object to be cut, wherein the acting portion includes a main body portion, an intermediate portion whose thickness is smaller than a thickness of the main body portion, and a small thickness portion whose thickness is smaller than the thickness of the intermediate portion, the intermediate portion has a thickness of 0.3 to 0.7 mm, and the small thickness portion has a thickness of 0.1 to 0.3 mm and a width of 2.5 to 10 mm.

The small thickness portion may be provided roughly in a center of the main body portion in a thickness direction thereof.

A wavy edge or a jagged edge may be provided at at least part of an edge portion of the small thickness portion in a length direction thereof, the edge portion being on a side where the object to be cut is cut.

No cutting edge may be provided at an edge portion of the small thickness portion.

At least one other plate material may be stacked on and firmly fixed to at least one side of a core material forming the small thickness portion, in such a way that an edge portion of the core material protrudes as the small thickness portion.

The core material of the small thickness portion and the other plate material may be firmly fixed to each other by rolling.

The core material of the small thickness portion and the other plate material may be firmly fixed to each other by seizing, welding, or adhesive bonding.

An edge portion of the other plate material stacked on the core material of the small thickness portion may be cut so as to have a wave pattern.

A cross section of an edge portion of the small thickness portion on a side where the object to be cut is cut may be formed so as to be roughly in a shape of a sharp-pointed end.

A cross section of an edge portion of the small thickness portion on a side where the object to be cut is cut may be formed so as to be roughly rectangular.

A method for manufacturing a cutting implement according to the present invention includes: a step of cutting an edge portion of a plate material, which will be an acting portion of the cutting implement, so as to be a small thickness portion having a thickness of 0.1 to 0.5 mm and a width of 2.5 to 20 mm; and a step of forming a cross section of an edge portion of the small thickness portion on a side where an object to be cut is cut, so as to be roughly in a shape of a sharp-pointed end or roughly rectangular.

Another method for manufacturing a cutting implement according to the present invention includes: a step of stacking at least one other plate material on at least one side of a core material forming a small thickness portion, in such a way that an edge portion of the core material protrudes as the small thickness portion; and a step of firmly fixing the core material of the small thickness portion and the other plate material to each other.

A cutting implement according to the present invention is a kitchen knife, a knife, a peeler, a slicer, or a cutting implement for processing vegetables.

Advantageous Effects of Invention

According to the present invention, it is possible to provide a cutting implement which is easily ground or which needs no grinding and is safe.

BRIEF DESCRIPTION OF DRAWINGS

FIGS. 4A and 4B are explanatory diagrams showing, for comparison, a cross section of a conventional convex edge and a cross section of the acting portion of the cutting implement according to the embodiment of the present invention.

FIGS. 5A and 5B are explanatory diagrams showing, for comparison, cutting by the conventional convex edge and cutting by the acting portion of the cutting implement of the embodiment of the present invention.

FIGS. 6A to 6C are explanatory diagrams showing grinding of the conventional convex edge.

DESCRIPTION OF EMBODIMENTS

Hereinafter, an example of an embodiment of the present invention will be described using the drawings. Moreover, a conventional technology is shown when necessary to describe a difference therefrom.

Figure 1A:
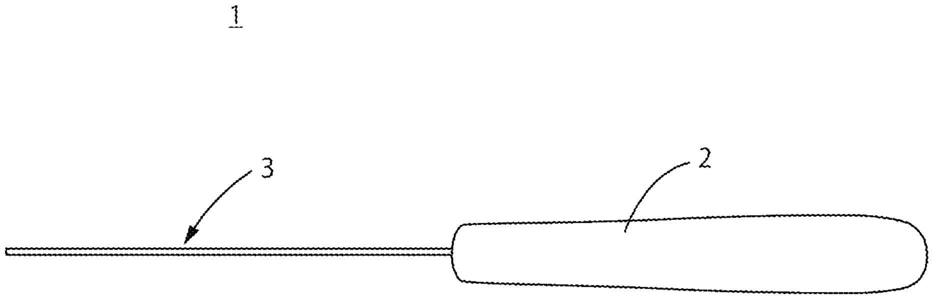
FIG. 1A is a plan view and FIG. 1B is a side view of a kitchen knife as an example of a cutting implement of the present invention.
Figure 1B:
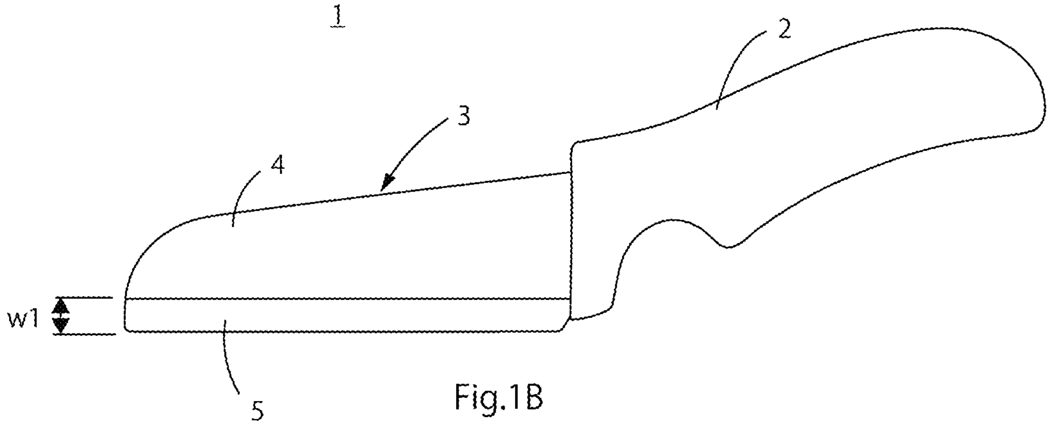

FIGS. 1A and 1B shows a kitchen knife 1 as an example of a cutting implement of the present embodiment. FIG. 1A shows a flat surface of the kitchen knife 1 and FIG. 1B shows a side surface of the kitchen knife 1.

Figure 2:
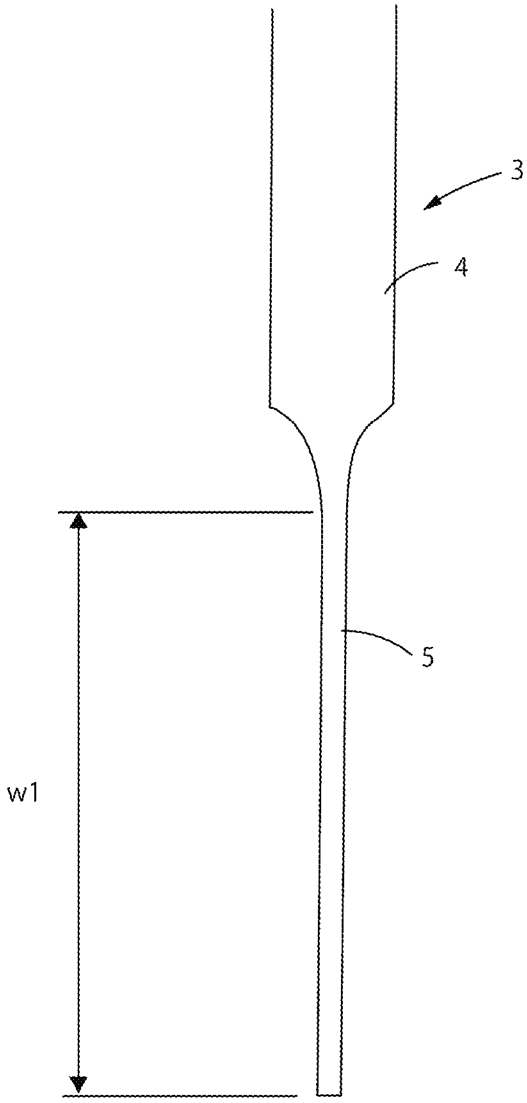
FIG. 2 is a cross-sectional view of an acting portion of a cutting implement according to an embodiment of the present invention.

FIG. 2 shows a cross section of an acting portion 3 of the kitchen knife 1. It is to be noted that the cross section here means a cross section perpendicular to the length direction of the acting portion.

The kitchen knife 1 of the present embodiment includes a haft 2 and the acting portion 3. The acting portion 3 refers to a portion made up of a thin metallic piece, for example, and includes a main body portion 4 and a small thickness portion 5. It is to be noted that a material for the acting portion 3 is not limited to metal. Moreover, though not shown in the drawing, part of the acting portion 3 is called a tang and extends inside the haft 2.

The small thickness portion 5 has a uniform thickness which is smaller than the thickness of the main body portion 4. The small thickness portion 5 is provided as a cutting acting portion of the acting portion 3 so as to protrude from one end edge of the main body portion 4. That is, in the kitchen knife 1, the small thickness portion 5 is provided in a lower part of the kitchen knife 1 when viewed from the side thereof (FIG. 1B).

The small thickness portion 5 is an area of a width w1 from an end of the acting portion 3, which is located on the side where an object to be cut is cut, to the inside of the acting portion 3. The small thickness portion 5 has a portion which is not gradually reduced toward an end and has a nearly uniform thickness. That is, the small thickness portion 5 has a portion which is nearly parallel in cross section.

The thickness of the small thickness portion 5 ranges, for example, from 0.1 to 0.5 mm, preferably from 0.1 to 0.4 mm, and, more preferably from 0.15 to 0.3 mm. The width of the small thickness portion 5 ranges, for example, from 2.5 to 20 mm, preferably from 3 to 18 mm, and, more preferably from 4 to 16 mm. The main body portion 4 only has to be thicker than the small thickness portion 5 and the thickness, width, and shape thereof are not limited; the thickness of the main body portion 4 ranges, for example, from 0.6 to 3 mm and preferably from 0.8 to 2.0 mm.

Moreover, the thickness of the small thickness portion 5 can be set such that, for example, the ratio thereof to the thickness of the main body portion 4 ranges from 3:10 to 8:10 and preferably from 5:10 to 6:10.

The thickness of the small thickness portion 5 differs depending on the softness, viscosity, adhesive, or the like of a solid object; for example, a somewhat thick small thickness portion 5 is preferable when a vegetable is cut and a thin small thickness portion 5 is preferable when meat is cut. Moreover, the thickness of the small thickness portion 5 also differs depending on the degree to which an edge at an end has been ground or the state of difference in level (serrations).

It is preferable that the small thickness portion 5 is provided roughly in the center of the main body portion 4 in the thickness direction thereof. The shape of a connection part between the main body portion 4 and the small thickness portion 5 is not limited; it is preferable that the small thickness portion 5 is thickened in a curved manner and connects to the main body portion 4. As an example, a cross section of an edge portion of the small thickness portion 5 on the side where the object to be cut is cut is rectangular. That is, a cutting edge is not formed. It is to be noted that a cross section of an edge portion of the small thickness portion 5 on the side where the object to be cut is cut is not limited to a rectangular shape, and may have the shape of a sharp-pointed end. The "shape of a sharp-pointed end" here means a shape obtained by sharpening the edge portion, and includes a shape obtained by chamfering an edge portion of the small thickness portion 5 and includes all of the cases where an end is acute, right-angled, obtuse, and semicircular. Edge sharpening may be performed. Edge sharpening and a cutting edge here mean an edge portion provided with an end shape with an angle of 45 degrees or less.

The small thickness portion 5 and the main body portion 4 may have a mirror finish, a satin finish, or the like.

Figure 3:
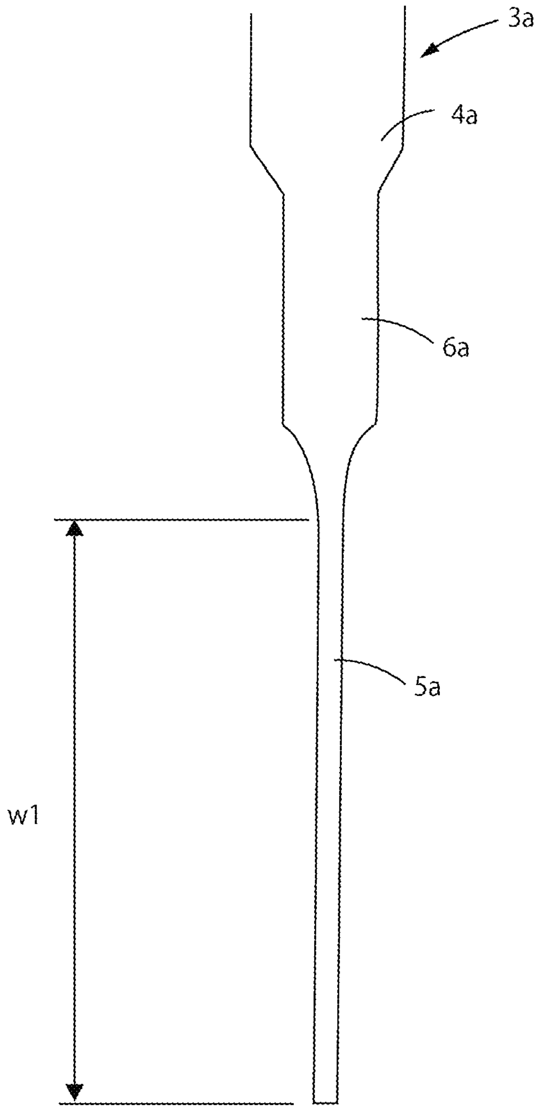
FIG. 3 is a cross-sectional view of an acting portion of a cutting implement according to a second embodiment of the present invention.

FIG. 3 is a cross-sectional view of an acting portion of a cutting implement according to a second embodiment. It is to be noted that, in the following description, identical or common portions are denoted by the same reference sign and overlapping explanations are omitted.

An acting portion 3*a* of the second embodiment includes a main body portion 4*a*, a small thickness portion 5*a*, and an intermediate portion 6*a*. The intermediate portion 6*a* is formed so as to be thinner than the main body portion 4*a* and thicker than the small thickness portion 5*a*. It is preferable that each of the main body portion 4*a*, the small thickness portion 5*a*, and the intermediate portion 6*a* has a uniform thickness.

The intermediate portion 6*a* has the function of supporting the small thickness portion 5*a*. This makes it possible to further reduce the thickness of the small thickness portion 5*a*. In the present embodiment, the thickness of the main body portion 4*a* ranges, for example, from 1 to 3 mm and preferably from 1 to 2.5 mm. The thickness of the intermediate portion 6*a* ranges, for example, from 0.3 to 0.7 mm, preferably from 0.3 to 0.6 mm, and more preferably from 0.3 to 0.5 mm.

On the other hand, the thickness of the small thickness portion 5*a* ranges, for example, from 0.1 to 0.4 mm, preferably from 0.1 to 0.3 mm, and more preferably from 0.1 to 0.2 mm. The width w1 of the small thickness portion 5*a* ranges, for example, from 2.5 to 10 mm, preferably from 2.5 to 8 mm, and more preferably from 3 to 6 mm.

Moreover, the thickness of the intermediate portion 6*a* can be set such that, for example, the ratio thereof to the thickness of the main body portion 4*a* ranges from 3:10 to 8:10 and preferably from 5:10 to 6:10.

Furthermore, the thickness of the small thickness portion 5*a* can be set such that, for example, the ratio thereof to the thickness of the intermediate portion 6*a* ranges from 3:10 to 8:10 and preferably from 5:10 to 6:10.

In addition, the main body portion 4*a* and the intermediate portion 6*a* do not necessarily have to have the shape of a parallel plate and may be tapered.

Moreover, the shape of an edge portion of the small thickness portion 5*a* on the side where the object to be cut is cut may be a rectangular shape like that shown in FIG. 3 or the shape of a sharp-pointed end.

FIGS. 4A and 4B show, for comparison, a cross section of a conventional convex edge 7 (FIG. 4A) and a cross section of the acting portion 3 according to a first embodiment (FIG. 4B).

The convex edge 7 has a cross-sectional shape obtained as a result of a cutting edge 8 connecting to a main body portion 9 along a gentle arc. An arc on each side of the cutting edge 8 of the convex edge 7 is curved outward. On the other hand, the acting portion 3 has the uniform and thin small thickness portion 5, which is thickened at an upper edge portion thereof and connects to the main body portion 4. It is to be noted that, in an example of FIG. 4B, an edge portion of the small thickness portion 5 on the side where the object to be cut is cut is rectangular; the edge portion may have the shape of a sharp-pointed end.

FIGS. 5A and 5B show, for comparison, the action of cutting by the conventional convex edge 7 (FIG. 5A) and the action of cutting by the acting portion 3 (FIG. 5B).

As shown in FIG. 5A, after cutting into an item to be cut 10 at the cutting edge 8, the convex edge 7 cleaves the item to be cut 10 in such a way as to push the item to be cut 10 apart on both sides at contact points 11. By pushing the item to be cut 10 apart on both sides at the contact points 11, a crack point 12 is formed in the item to be cut 10. By pushing the convex edge 7, the crack point 12 moves and cutting of the item to be cut 10 progresses.

In the convex edge 7, since each side of the cutting edge 8 is arc-shaped and curved outward, resistance to a downward force pushing the convex edge 7 is high. Moreover, since the distance (a lever) between the contact point 11 of the convex edge 7 and the crack point 12 is short, a great force pushing the item to be cut apart on both sides is needed in order to form a crack. As a result, the convex edge 7 requires a great force to perform cutting.

For example, when a pumpkin is cut, a split appears first when a force is applied to an edge, which sometimes makes it impossible to obtain a cut surface as a clean flat surface. In addition, if the end is provided with an acute angle to avoid this problem, the edge is easily nicked.

On the other hand, after cutting into the item to be cut 10 at an edge portion of the small thickness portion 5 on the side where the object to be cut is cut, the acting portion 3 of the present embodiment pushes the item to be cut 10 apart on both sides at contact points 13, which sometimes causes a crack point 14 to appear in the item to be cut 10; however, since an area which is about to be a crack is minute, the area in actuality does not develop into a crack and is absorbed in an area in which a food material is deformed, which makes it possible to obtain a cut as a clean flat surface. As described above, the acting portion 3 has the thin small thickness portion 5, which makes it easy to cut into the item to be cut 10.

By pushing the acting portion 3, the crack point 14 moves and cutting of the item to be cut 10 progresses.

In the acting portion 3, since the distance between the contact point 13 and the crack point 14 is long and a lever is long, a crack moves by a weak force. Moreover, at the contact point 13, upward resistance to a downward force pushing the acting portion 3 is low. This allows the acting portion 3 of the present embodiment to perform cutting with a weak force.

FIGS. 6A to 6C show grinding of the conventional convex edge 7.

FIG. 6A shows the convex edge 7 before use and FIG. 6B shows the convex edge 7 which has become blunt after use. FIG. 6C shows how grinding of the convex edge 7 is performed.

As shown in FIG. 6A, before use, the convex edge 7 has a shape with the sharp-pointed cutting edge 8. However, after use, the cutting edge of the convex edge 7 has become blunt and has an arc shape like that shown in FIG. 6B. In a state shown in FIG. 6B, a great force is needed to cut into the item to be cut. Moreover, after cutting into the item to be cut, a great force is needed to cleave the item to be cut against resistance.

Thus, grinding is performed using, for example, an hourglass-shaped grinding tool 15 like that shown in FIG. 6C to restore the blunt cutting edge shape to the original cutting edge shape. As shown in FIG. 6C, when grinding is performed to restore the blunt cutting edge to the original cutting edge shape of the convex edge 7, a portion to be cut 16 that is shaved is large.

Figure 7A:
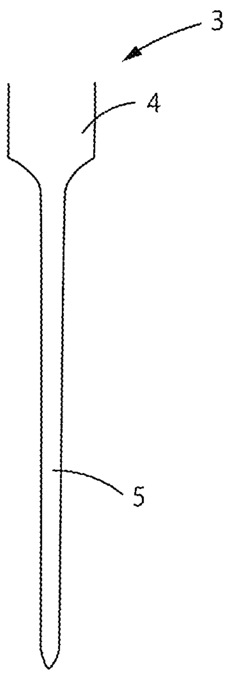
FIGS. 7A to 7C are explanatory diagrams showing grinding of the acting portion of the cutting implement according to the embodiment of the present invention.
Figure 7B:
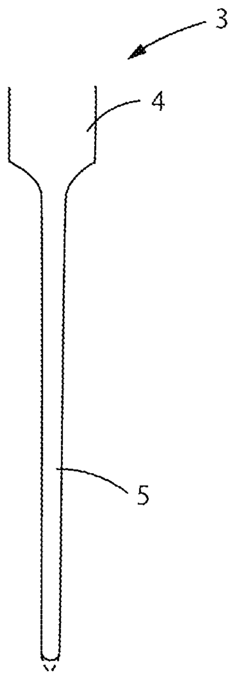
Figure 7C:
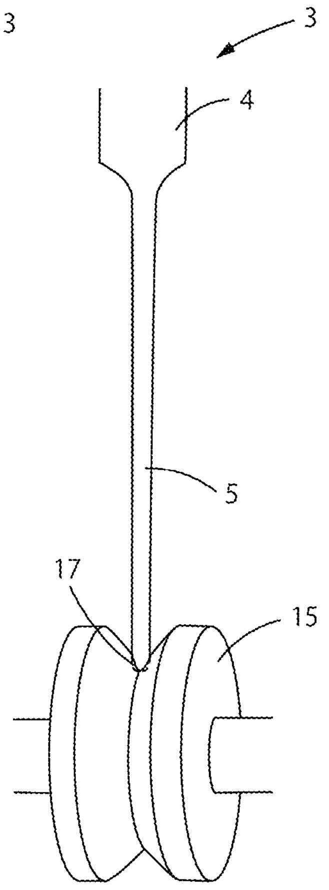

FIGS. 7A to 7C show grinding of the acting portion 3 of the present embodiment.

FIG. 7A shows the acting portion 3 before use. It is to be noted that, in an example of FIG. 7A, an edge portion of the small thickness portion on the side where the object to be cut is cut has the shape of a sharp-pointed end. FIG. 7B shows the acting portion 3 which has become blunt after use. FIG. 7C shows how grinding of the acting portion 3 is performed.

As shown in FIG. 7A, before use, an edge portion of the small thickness portion 5 on the side where the object to be cut is cut has the shape of a sharp-pointed end. However, after use, the edge portion has become blunt and has a blunt shape like that shown in FIG. 7B.

Thus, as illustrated in FIG. 7C, grinding is performed using, for example, an hourglass-shaped grinding tool 15 to restore the blunt shape of the edge portion of the small thickness portion 5 on the side where the object to be cut is cut to the original shape. As is clear from FIG. 7C, when grinding is performed to restore the edge portion of the small thickness portion 5 on the side where the object to be cut is cut to the original shape of a sharp-pointed end, a portion to be cut 17 that is shaved is small. Moreover, it is easy to perform grinding.

When an edge portion of the small thickness portion 5 on the side where the object to be cut is cut is rectangular, there is no need to perform grinding and it can be used almost semipermanently.

Moreover, when an edge portion of the small thickness portion 5 on the side where the object to be cut is cut is rectangular, elderly people and children can use it safely.

Figure 8:
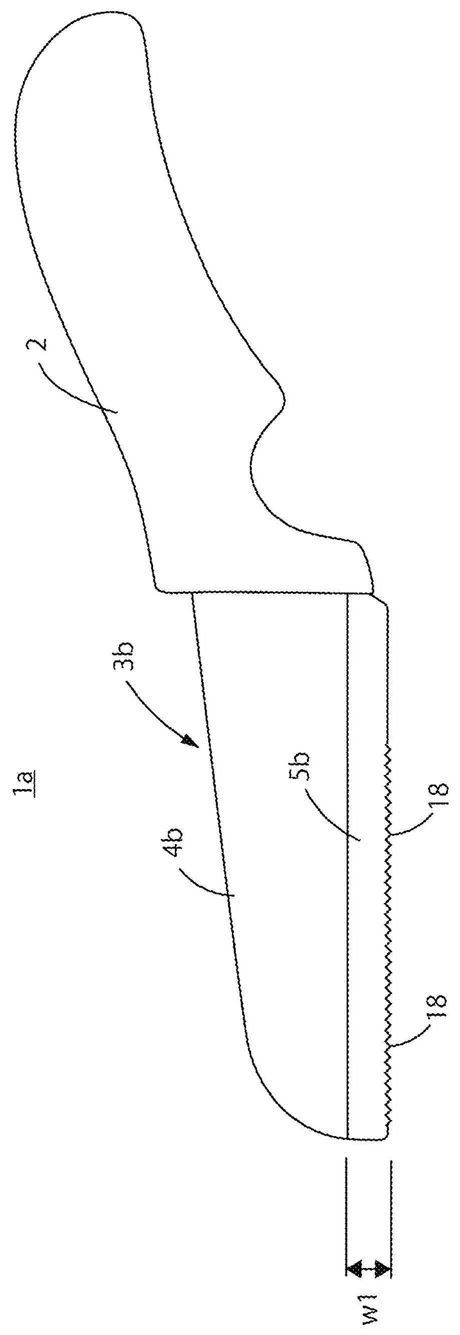
FIG. 8 is a side view of a kitchen knife which is a cutting implement according to an embodiment of the present invention.

FIG. 8 shows a side surface of a kitchen knife according to an embodiment of the present invention.

A kitchen knife 1*a* of the present embodiment includes a haft 2 and an acting portion 3*b*. The acting portion 3*b* includes a main body portion 4*b* and a small thickness portion 5*b*. It is preferable that the thickness of the small thickness portion 5*b* ranges from 0.1 to 0.5 mm and the width w1 thereof ranges from 2.5 to 20 mm.

The small thickness portion 5*b* of the present embodiment has a jagged edge 18 at at least part of an edge portion thereof in the length direction of the acting portion 3*b*, the edge portion being on the side where the object to be cut is cut. The jagged edge 18 has a plurality of triangular parts, each being triangular when viewed from the side, which are provided in a continuous manner. The acting portion 3*b* with the jagged edge 18 is suitably used to cut hard bread and meat, for example.

The pitch of the jagged edge ranges from 1 to 10 mm and preferably from 2 to 8 mm, and the depth of an edge of the jagged edge ranges from 0.5 to 5 mm and preferably from 1 to 4 mm.

The jagged edge is shown here; it is assumed that the shapes also include a shape like a saw-toothed edge.

Figure 9:
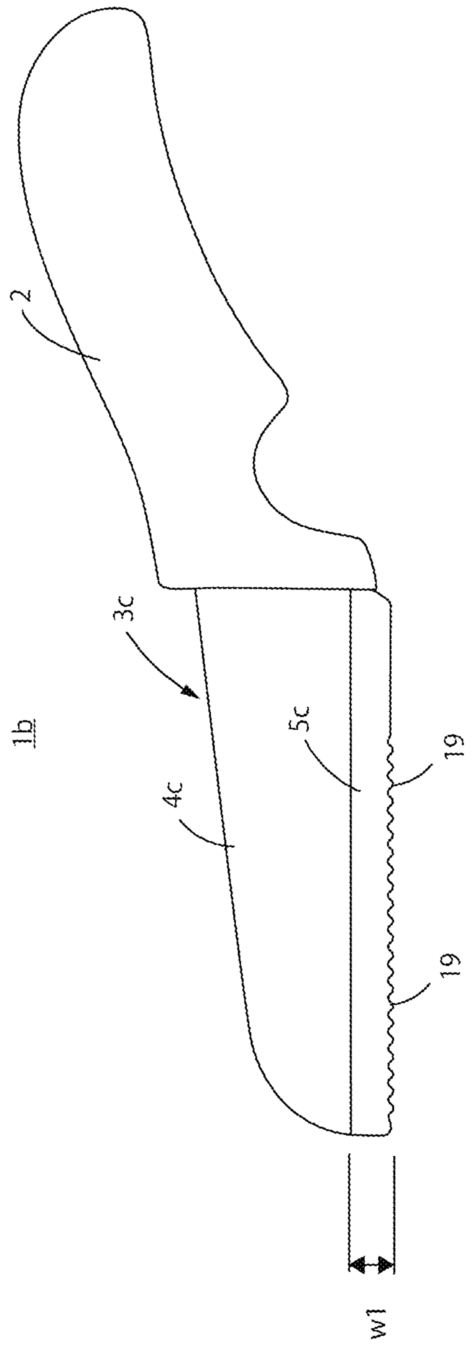
FIG. 9 is a side view of a kitchen knife which is a cutting implement according to an embodiment of the present invention.

FIG. 9 shows a side surface of a kitchen knife according to another embodiment.

A kitchen knife 1*b* of the present embodiment includes a haft 2 and an acting portion 3*c*. The acting portion 3*c* includes a main body portion 4*c* and a small thickness portion 5*c*. It is preferable that the thickness of the small thickness portion 5*c* ranges from 0.1 to 0.5 mm and the width w1 thereof ranges from 2.5 to 20 mm.

The small thickness portion 5*c* of the present embodiment has a wavy edge 19 at at least part of an edge portion thereof in the length direction of the acting portion 3*c*, the edge portion being on the side where the object to be cut is cut. The wavy edge 19 has a plurality of curved parts, each being curved when viewed from the side, which are provided in a continuous manner. The acting portion 3*c* with the wavy edge 19 is suitably used to cut cheese and soft bread, for example.

The pitch of the wavy edge ranges from 1 to 15 mm and preferably from 2 to 12 mm, and the depth of an edge of the wavy edge ranges from 0.5 to 5 mm and preferably from 1 to 4 mm.

Increasing the pitch of the wavy edge makes it easier to cut soft bread.

The jagged edge and the wavy edge are shown here; they may be combined and triangular parts and the curved parts do not necessarily have to be provided in a continuous manner.

Figure 10:
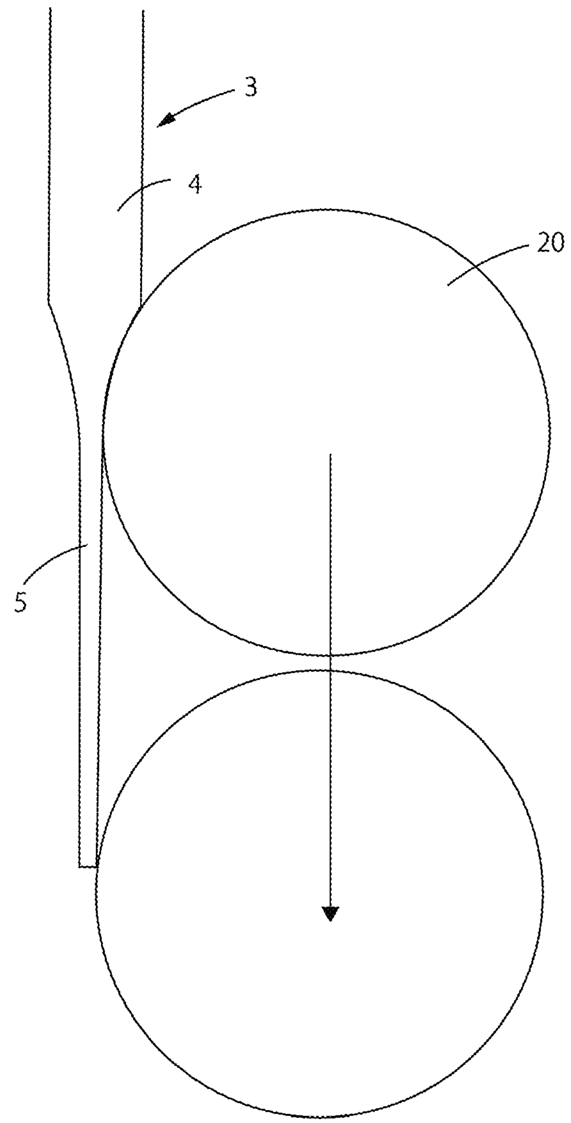
FIG. 10 is an explanatory diagram showing a step of manufacture or grinding of an acting portion of a cutting implement according to an embodiment of the present invention.
Figure 11:
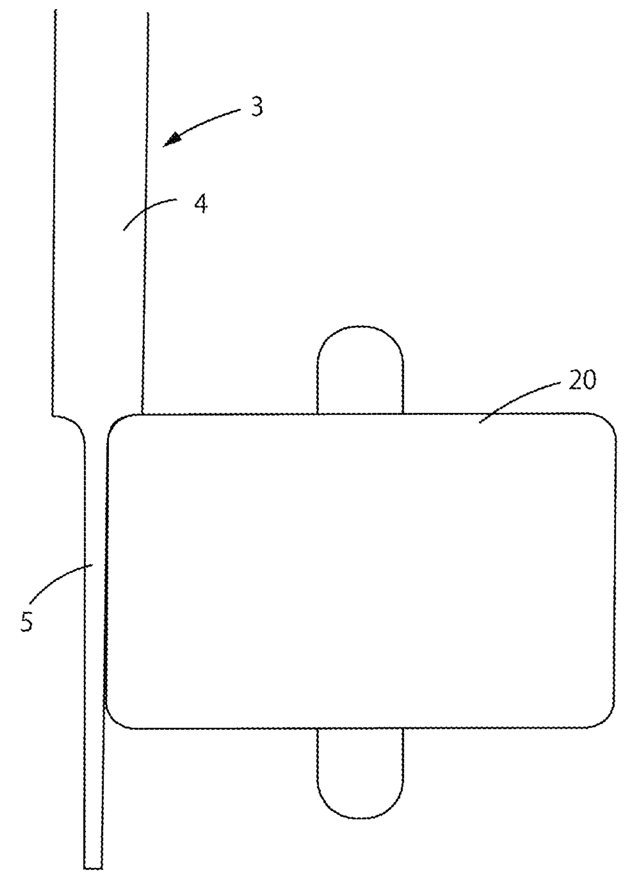
FIG. 11 is an explanatory diagram showing a step of manufacture or grinding of the acting portion of the cutting implement according to the embodiment of the present invention.
Figure 12:
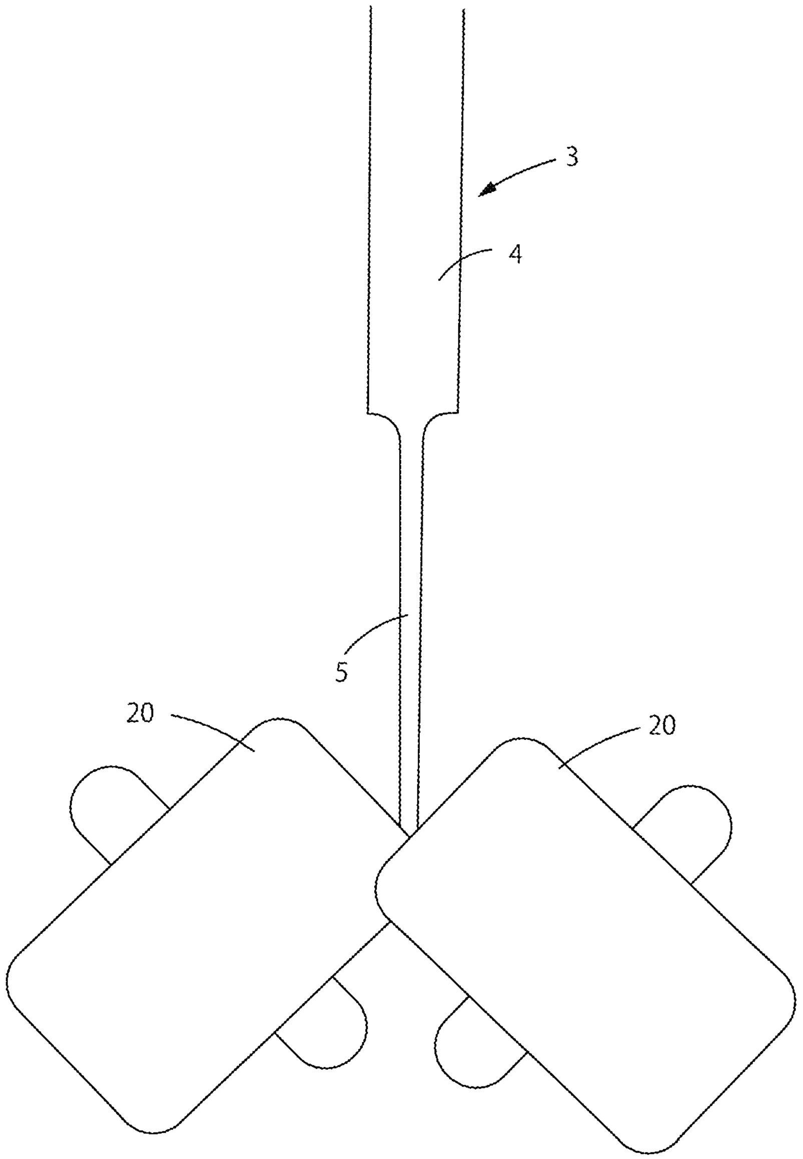
FIG. 12 is an explanatory diagram showing a step of manufacture or grinding of the acting portion of the cutting implement according to the embodiment of the present invention.

FIGS. 10 to 12 show steps of manufacture or grinding of an acting portion according to an embodiment of the present invention.

Manufacture or grinding shown in FIG. 10 illustrates a case where cutting or grinding is performed with a grinder 20 from a connection between the main body portion 4 and the small thickness portion 5 of the acting portion 3 toward an edge portion on the side where the object to be cut is cut.

This step is suitable for uniformly cutting or grinding the thickness of the small thickness portion 5 in the width direction thereof.

Manufacture or grinding shown in FIG. 11 illustrates a step of cutting or grinding the small thickness portion 5 with the grinder 20 in the length direction of the acting portion 3.

This step is suitable for uniformly cutting or grinding the thickness of the small thickness portion 5 in the length direction of the acting portion 3.

Manufacture or grinding shown in FIG. 12 illustrates a step of cutting or grinding an edge portion of the small thickness portion 5 on the side where the object to be cut is cut.

This step uses a pair of grinders 20 placed in a linear manner. The grinders 20 are inclined in opposite directions such that the circumferential surfaces cross each other when viewed from the arrangement direction. An edge portion of the small thickness portion 5 of the acting portion 3 is moved in a translation manner so as to be in contact with the circumferential surfaces of the grinders 20. By doing so, corners of an edge part of the small thickness portion 5 are chamfered and formed in the shape of a sharp-pointed end. By changing the angle of inclination of the grinder 20, it is possible to obtain any one of acute, right-angled, and obtuse ends. Since a portion that is shaved is small in cutting or grinding of an edge portion of the small thickness portion 5 on the side where the object to be cut is cut, it is possible to perform grinding with ease. The smallish grinder 20 is shown in FIGS. 11 and 12; a large grinder may be used to shave a portion in one stroke.

Figure 13:
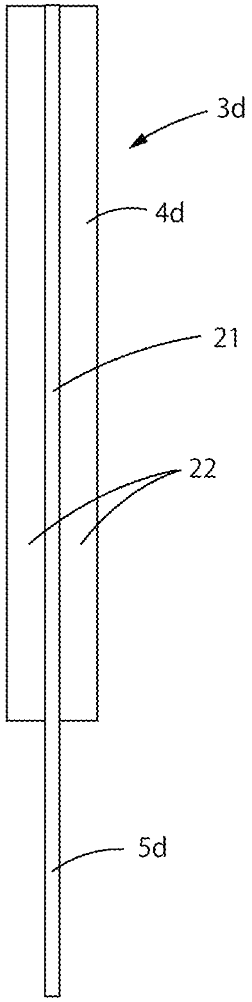
FIG. 13 is a cross-sectional view of an acting portion of a cutting implement according to a third embodiment of the present invention.

FIG. 13 shows a cross-sectional view of an acting portion of a cutting implement according to a third embodiment.

An acting portion 3*d* of the present embodiment includes a core material 21 whose part forms a small thickness portion 5*d* and a pair of plate materials 22 forming a main body portion 4*d*.

Figure 14:
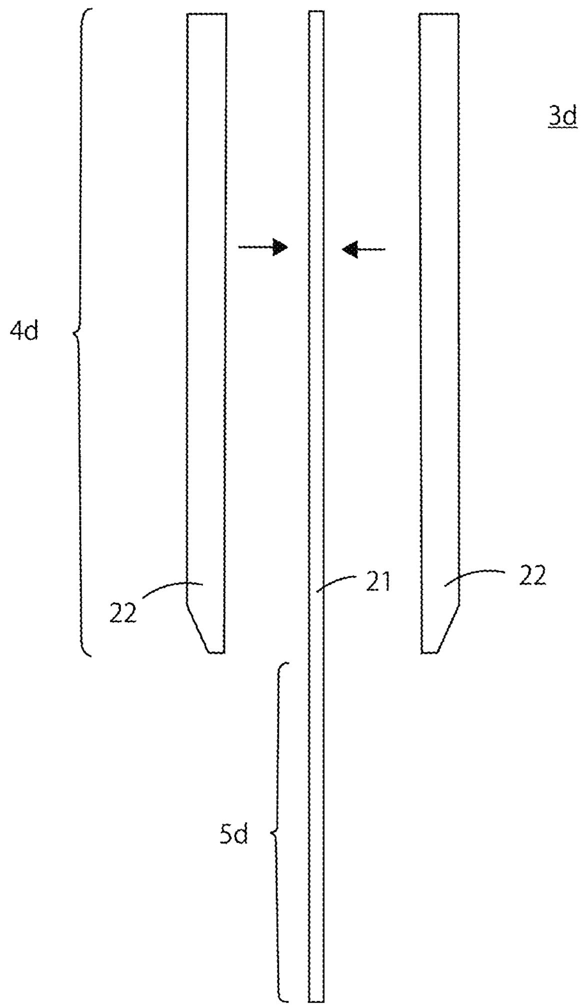
FIG. 14 is an explanatory diagram showing a method for manufacturing the acting portion of the cutting implement according to the third embodiment of the present invention.

FIG. 14 shows a method for manufacturing the acting portion 3*d* of the cutting implement of the third embodiment.

As shown in FIG. 14, the plate materials 22 are placed on both sides of the core material 21 in such a way that the small thickness portion 5*d* protrudes as a cutting acting portion. Then, the plate materials 22 are firmly fixed to the core material 21. As a fixing method, rolling or cladding in which heating and hot rolling are performed can be adopted. Moreover, methods such as seizing, welding, spot welding, and adhesive bonding may be adopted.

It is to be noted that, in FIGS. 13 and 14, the plate materials 22 are stacked on both sides of the core material 21 and fixed thereto; the plate material 22 may be stacked on one side of the core material 21 and fixed thereto.

Moreover, in FIG. 13, an edge portion of the plate material 22 is rectangular at a connection between the main body portion 4*d* and the small thickness portion 5*d*; as shown in FIG. 14, an edge portion of the plate material 22 may have a shape obtained by chamfering a corner of an edge portion of the plate material 22.

Figure 15:
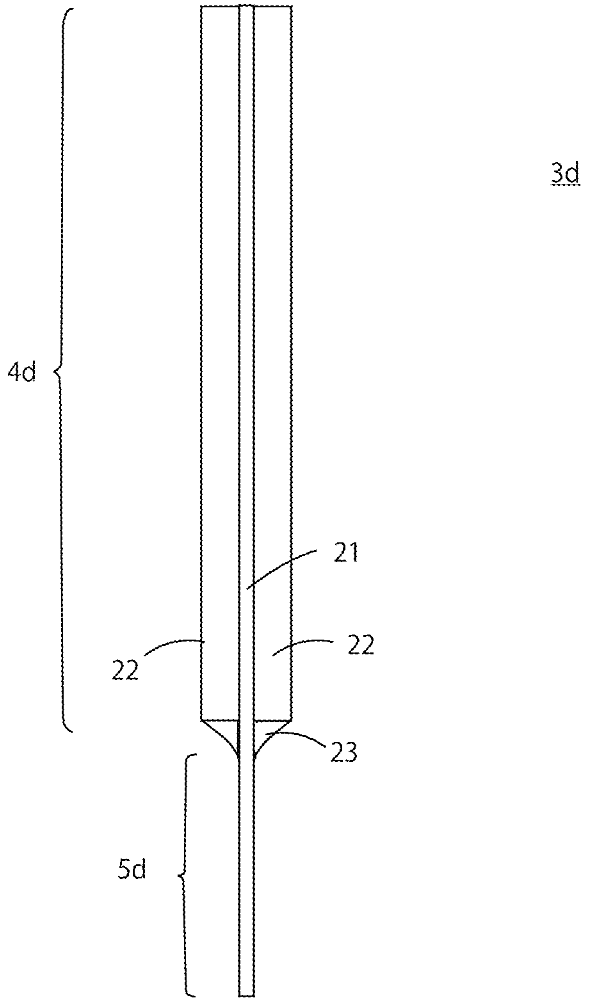
FIG. 15 is an explanatory diagram showing another method for manufacturing the acting portion of the cutting implement according to the third embodiment of the present invention.

Alternatively, as shown in FIG. 15, an edge portion of the plate material 22 may be formed to have a rectangular shape at a connection between the main body portion 4*d* and the small thickness portion 5*d* and fillet weld 23 may be performed.

Figure 16A:
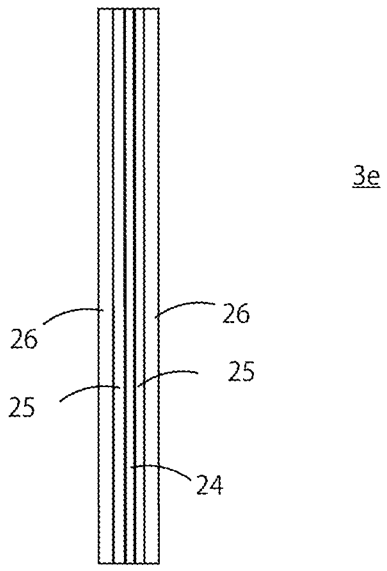
FIGS. 16A and 16B are sectional views of an acting portion of a cutting implement according to a modified example of the third embodiment of the present invention.
Figure 16B:
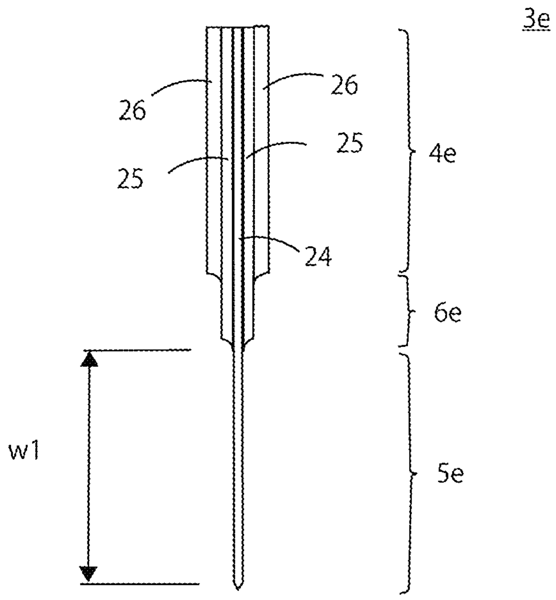

FIGS. 16A and 16B show a cross section of an acting portion 3*e* which is a modified example of the acting portion 3*d* of the third embodiment. FIG. 16A shows a plane sectional view of the acting portion 3*e* and FIG. 16B shows a cross-sectional view of the acting portion 3*e*.

The acting portion 3*e* of the present embodiment is formed by stacking a plate material 25 which is a second layer and a plate material 26 which is a third layer on each side of a core material 24 whose part forms a small thickness portion 5*e*.

As is clearly shown in FIG. 16(*b*), the plate material 25 and the plate material 26 are stacked in such a way that an edge portion of the core material 24 protrudes as the small thickness portion 5*e*; that is, the plate material 25 and the plate material 26 are placed such that the small thickness portion 5*e* has a width of w1. An edge portion of the plate material 25 which is the second layer can be protruded from the plate material 26 which is the third layer. In this case, the plate material 25 which is the second layer serves as an intermediate portion 6*e* supporting the small thickness portion 5*e*, which makes it possible to further reduce the thickness of the small thickness portion 5*e*. It goes without saying that it is also possible to align an edge portion of the plate material 25 which is the second layer with an edge portion of the plate material 26 which is the third layer.

Figure 17:
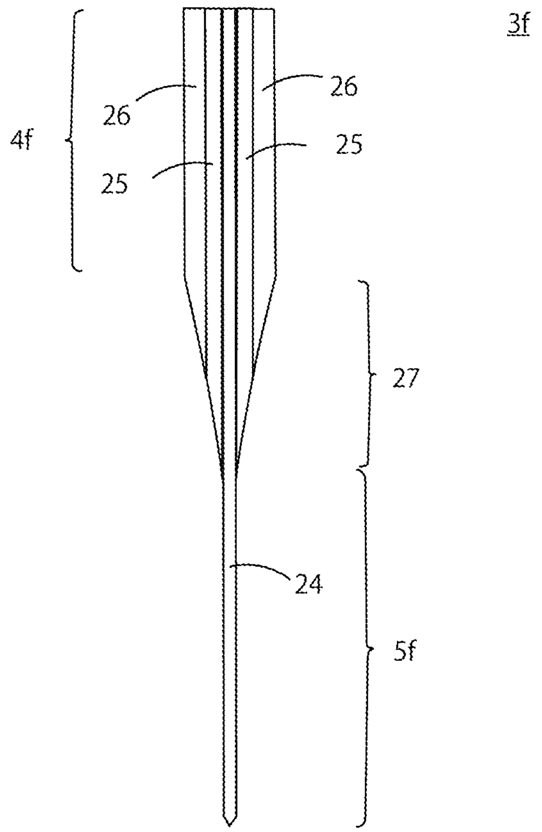
FIG. 17 is a cross-sectional view of an acting portion of a cutting implement according to another modified example of the third embodiment of the present invention.

FIG. 17 shows a cross-sectional view of an acting portion of a cutting implement according to a modified example of FIG. 16.

An acting portion 3*f* shown in FIG. 17 is formed by stacking and firmly fixing a plate material 25 which is a second layer and a plate material 26 which is a third layer on and to each side of a core material 24. A portion where the core material 24 protrudes serves as a small thickness portion 5*f*, and a portion where the core material 24, the plate material 25, and the plate material 26 overlap one another serves as a main body portion 4*f*. In the present embodiment, a connection 27 between the main body portion 4*f* and the small thickness portion 5*f* is widely shaved at a bevel. This allows a joint between the plate material 25 and the plate material 26 to have a beautiful wave pattern.

It is to be noted that more plate materials can be stacked on and firmly fixed to side surfaces of the core material 24.

Moreover, Damascus steel with a woodgrain pattern may be obtained by stacking and forging multiple layers of metal.

Figure 18:
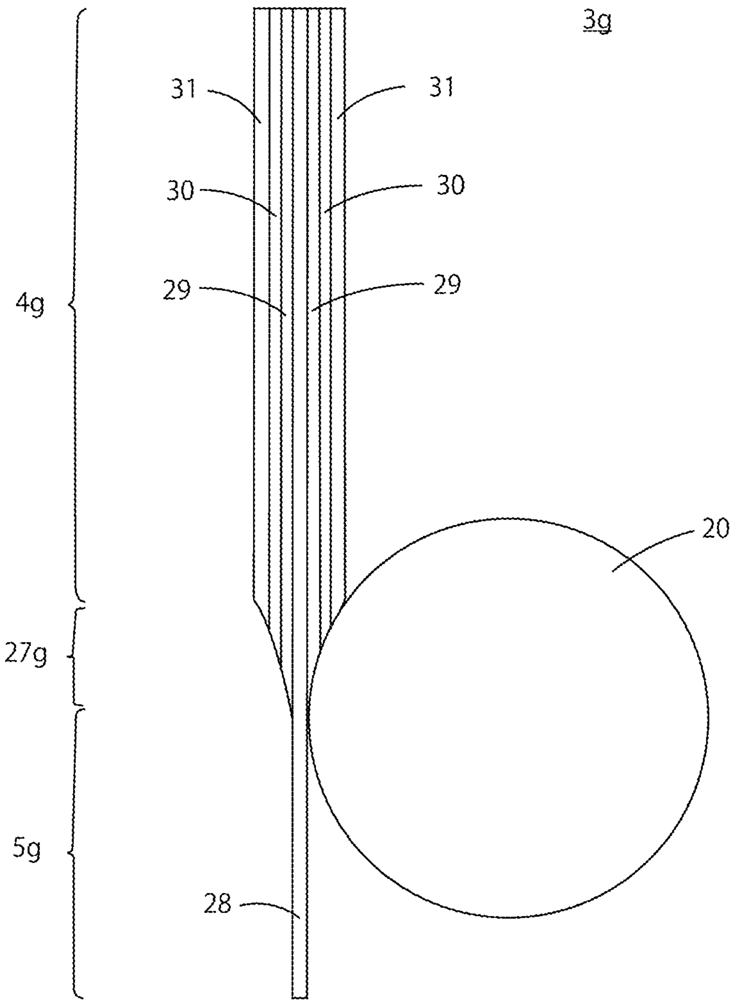
FIG. 18 is an explanatory diagram showing a method for manufacturing an acting portion, which has a wave pattern, of a cutting implement according to an embodiment of the present invention.

FIG. 18 shows a method for manufacturing an acting portion 3*g* having a wave pattern.

The acting portion 3*g* of the present embodiment is formed by stacking and firmly fixing a plate material 29 which is a second layer, a plate material 30 which is a third layer, and a plate material 31 which is a fourth layer on and to each side of a core material 28; the number of layers is not limited. An edge portion of the core material 28 protrudes and forms a small thickness portion 5*g*. A portion where the core material 28, the plate material 29 which is the second layer, the plate material 30 which is the third layer, and the plate material 31 which is the fourth layer overlap one another forms a main body portion 4*g* of the acting portion 3*g*. A portion between the main body portion 4*g* and the small thickness portion 5*g* forms a connection 27*g*.

The acting portion 3*g* of the present embodiment is formed by stacking the core material 28, the plate material 29 which is the second layer, the plate material 30 which is the third layer, and the plate material 31 which is the fourth layer and then shaving the connection 27*g* with a grinder 20. In doing so, it is preferable to perform cutting and grinding in such a way that the connection 27*g* becomes large in width so as to make a wave pattern clearly visible. This allows the connection 27*g* to have a wave pattern.

In place of the grinder 20 described above, another sharpener or grinder may be used to work on an acting portion as long as the other sharpener or grinder performs cutting and grinding, or an acting portion may be made thinner by being corroded by etching.

Figure 19:
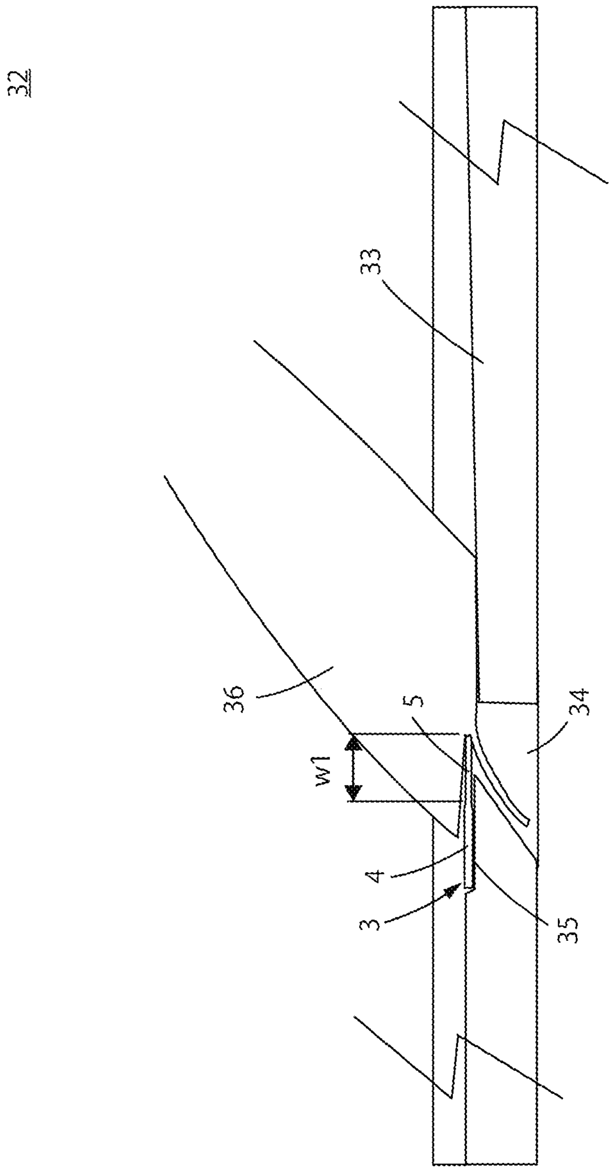
FIG. 19 is a sectional view showing an acting portion of a slicer according to an embodiment of the present invention.

FIG. 19 shows a slicer of an embodiment of the present invention.

A slicer 32 includes a base plate 33. The base plate 33 has a discharge slit 34. A recess 35 for fixing an acting portion 3 is provided in an edge part of the discharge slit 34. The acting portion 3 is placed in the recess 35 and fixed by a main body portion 4. Part of a small thickness portion 5 of the acting portion 3 protrudes into the discharge slit 34. An upper surface of the main body portion 4 of the acting portion 3 is preferably aligned with an upper surface of the base plate 33.

When a food material 36 is slid over the slicer 32 with this configuration, so as to be in contact with the upper surface of the base plate 33, part of the food material 36 is shaved by the acting portion 3 and discharged into an unillustrated container from the discharge slit 34.

This slicer 32 can remain sharp forever by the action of the small thickness portion 5 and the main body portion 4 even when an end of the small thickness portion 5 of the acting portion 3 wears out.

Figure 20:
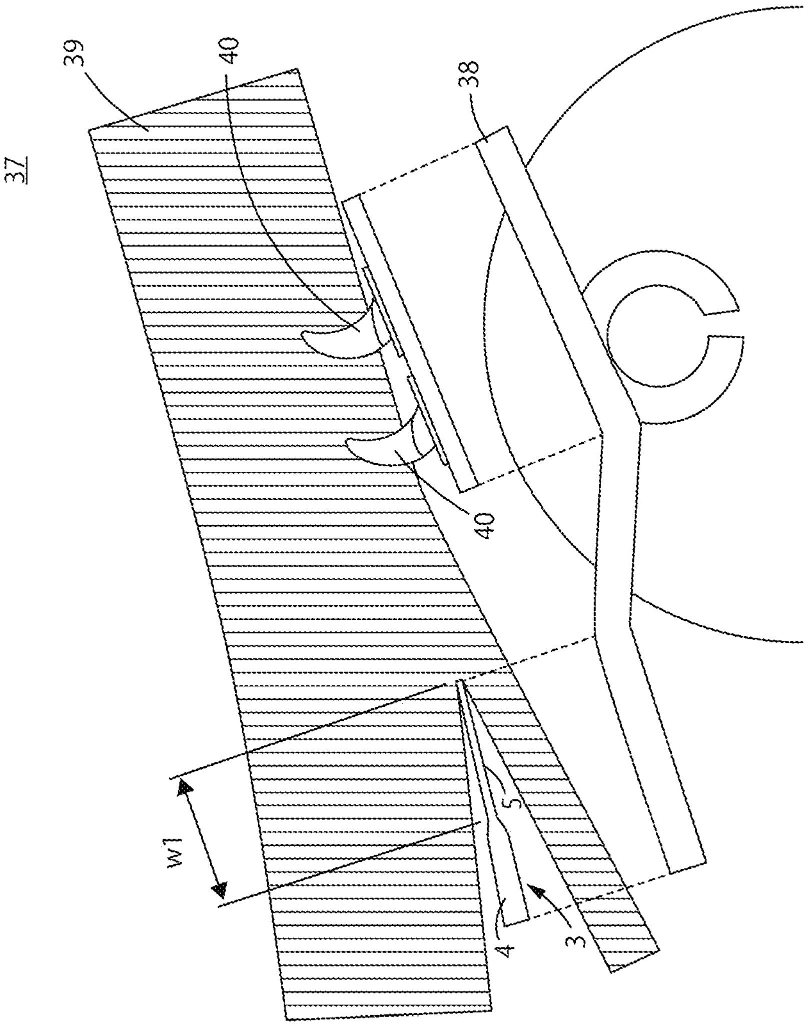
FIG. 20 is a sectional view showing an acting portion of a peeler according to an embodiment of the present invention.

FIG. 20 shows a peeler which is an embodiment of the present invention.

A peeler 37 includes a supporting member 38. A vertical blade 40 that defines a peel width is supported in an upper portion with respect to the supporting member 38 on an upstream side in a direction in which a food material 39 is fed. An acting portion 3 is supported by the supporting member 38 on a downstream side in the direction in which the food material 39 is fed. An opening (a difference in level) into which a thin peeled food material 39 goes is provided between a supporting base of the vertical blade 40 and the acting portion 3.

In the peeler 37 with this structure, the food material 39 is fed from the upstream side in the direction in which the food material 39 is fed, and is provided with a cut of a peel width by the vertical blade 40. Next, the surface of the food material 39 is shaved off by the acting portion 3 by the thickness of the opening (the difference in level) between the acting portion 3 and the supporting base of the vertical blade 40 and discharged through the opening.

This peeler 37 also makes it possible to obtain the peeler 37 that allows the acting portion 3 to remain sharp and can cut well for a long time.

Figure 21:
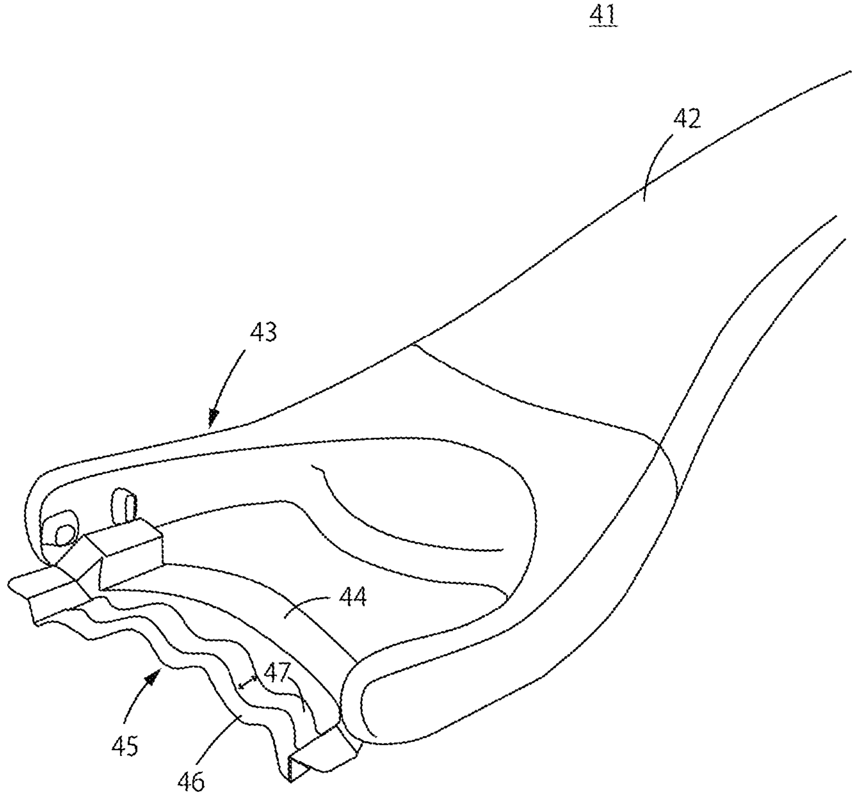
FIG. 21 is a sectional view showing an acting portion of a peeler according to another embodiment of the present invention.

FIG. 21 shows a peeler in another form.

A peeler 41 includes a grasping portion 42 and a holding portion 43. The holding portion 43 has a bifurcated end and supports both ends of a guide plate 44 and both ends of an acting portion 45 of the present invention.

The guide plate 44 has a curved surface so as to follow the surface of a food material such as vegetables. The acting portion 45 is corrugated in the length direction of the acting portion and includes a main body portion 46 and a small thickness portion 47 which are similar to those of the above-described acting portions 3, 3*a*, 3*g*, and so forth. Although the acting portion 45 is also corrugated, the acting portion 45 has a curved surface as a whole so as to follow the surface of the food material. A difference in level corresponding to the thickness of a peel of a food material to be peeled is provided between the guide plate 44 and the acting portion 45. The guide plate 44 and the acting portion 45 are preferably supported in such a way that both ends thereof can be rotated to some extent, which allows the guide plate 44 and the acting portion 45 to be rotated to a certain degree.

When the peeler 41 with this structure is pulled in the direction of the grasping portion 42 with the grasping portion 42 grasped and the acting portion 45 in contact with the surface of a food material, the surface of the food material is peeled by the difference in level between the guide plate 44 and the acting portion 45.

Since the acting portion 45 is corrugated, it is possible to make the food material have a corrugated surface.

Moreover, according to the present embodiment, it is possible to eliminate the need for grinding of the acting portion, which makes it possible to obtain the peeler 41 that does not need grinding of, in particular, a corrugated acting portion like that of the present embodiment, whose grinding is difficult to perform, and can be used for a long time.

It is to be noted that the cutting implement of the present embodiment can be used as a kitchen knife, a knife, a peeler, a slicer, and the like. Examples are not limited to the cutting implements described above, and the cutting implement can be used as various kinds of cutting implements for cooking and cutting implements for processing vegetables. It is assumed that the cutting implements for cooking and the cutting implements for processing vegetables here also include acting portions of machines and implements with a mechanical mechanism.

While a person skilled in the art may be able to conceive of additional effects or various modifications based on the description given above, embodiments of the present invention are not limited to the embodiments described above and presented by way of example. Various additions, changes, and partial elimination may be made without departing from the conceptual idea and spirit of the present invention which are derived from the subject matter recited in the claims and its equivalents.

REFERENCE SIGNS LIST

1, 1*a*, 1*b*: kitchen knife
2: haft
3, 45, 3*a*, 3*b*, 3*c*, 3*d*, 3*e*, 3*f*, 3*g*: acting portion
4, 9, 46, 4*a*, 4*b*, 4*c*, 4*d*, 4*e*, 4*f*, 4*g*: main body portion
5, 47, 5*a*, 5*b*, 5*c*, 5*d*, 5*e*, 5*f*, 5*g*: small thickness portion
6*a*, 6*e*: intermediate portion
7: convex edge
8: cutting edge
10: item to be cut
11, 13: contact point
12, 14: crack point
15: grinding tool
16, 17: portion to be cut
18: jagged edge
19: wavy edge
20: grinder
21, 24, 28: core material
22, 25, 26, 29, 30, 31: plate material
23: fillet weld
27: connection
32: slicer
33: base plate
34: discharge slit
35: recess
36, 39: food material
37, 41: peeler
38: supporting member
40: vertical blade
42: grasping portion
43: holding portion
44: guide plate
w1: width

The invention claimed is:

1. A cutting implement for cooking comprising:
an acting portion configured to cut a food material, wherein
the acting portion includes a main body portion and a small thickness portion having a thickness smaller than a thickness of the main body portion,
the main body portion has a thickness of 0.6 to 3.0 mm, and
a section of the small thickness portion has a width of 4 to 16 mm and a thickness of 0.1 to 0.5 mm, wherein
the small thickness portion includes an edge portion, and
the section of the small thickness portion uniformly extends toward the edge portion, and the thickness of the section of the small thickness portion is not reduced toward the edge portion, such that, in a cross-section of the small thickness portion, the section of the small thickness portion has opposite surfaces in the cross-section that are parallel with each other.

2. The cutting implement according to claim 1, wherein in the cross-section, the edge portion of the small thickness portion is rectangular.

3. The cutting implement according to claim 1, wherein a ratio of the thickness of the small thickness portion to the thickness of the main body portion ranges from 3:10 to 8:10.

4. The cutting implement according to claim 1, wherein small thickness portion is made of forged steel.

* * * * *